Aug. 27, 1935.  P. BURKE  2,012,418
LOAD LIMITING FRICTION CLUTCH
Filed May 24, 1933  3 Sheets-Sheet 1
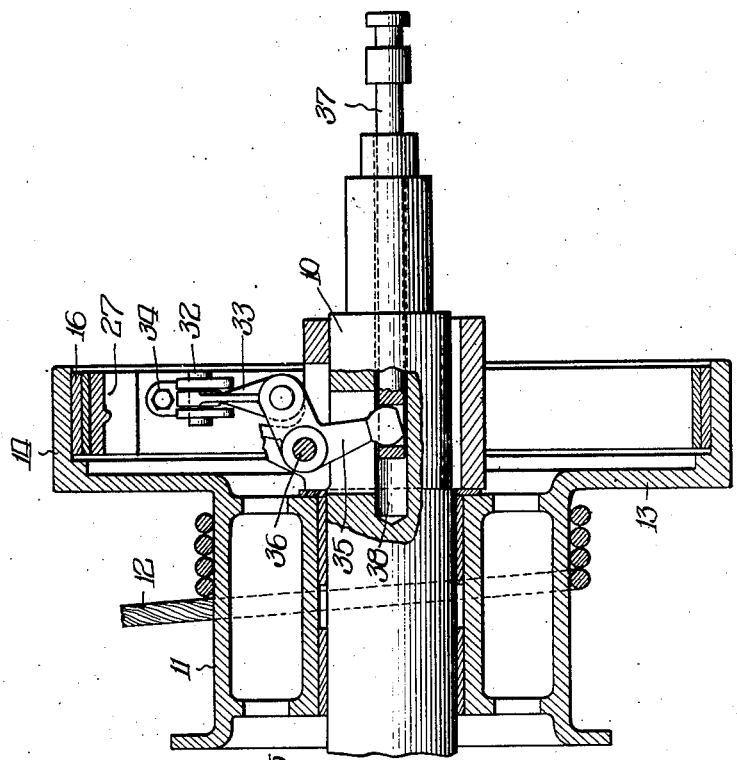
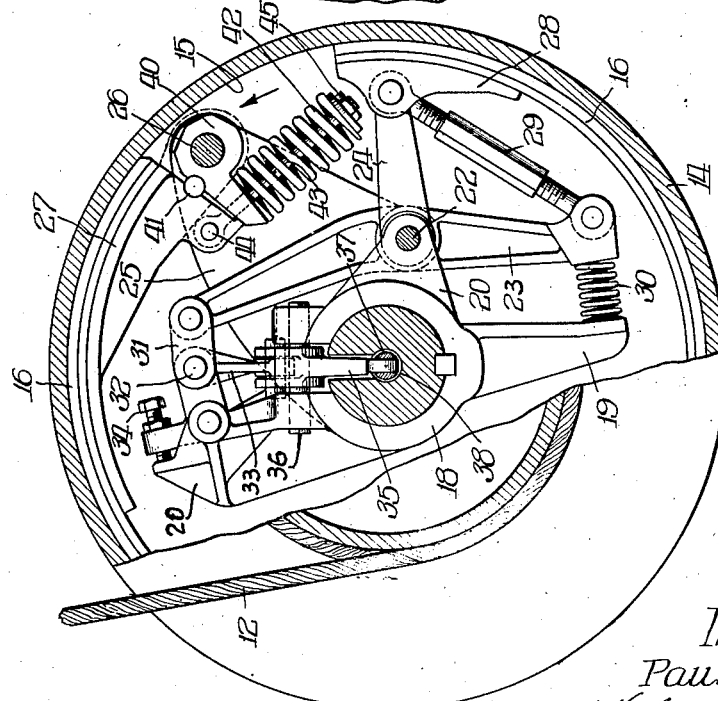
Inventor:
Paul Burke,

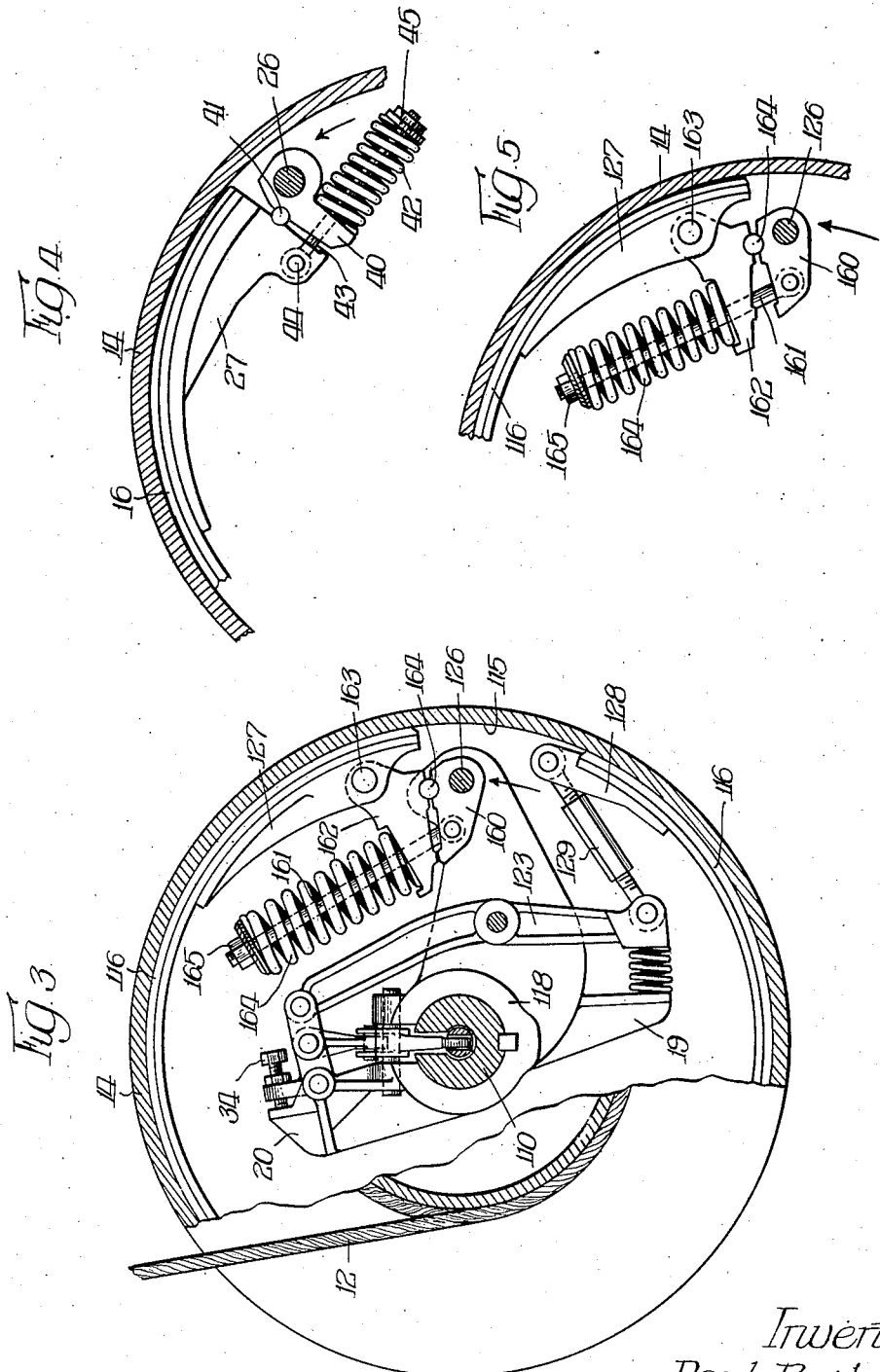

Aug. 27, 1935.    P. BURKE    2,012,418
LOAD LIMITING FRICTION CLUTCH
Filed May 24, 1933    3 Sheets-Sheet 3
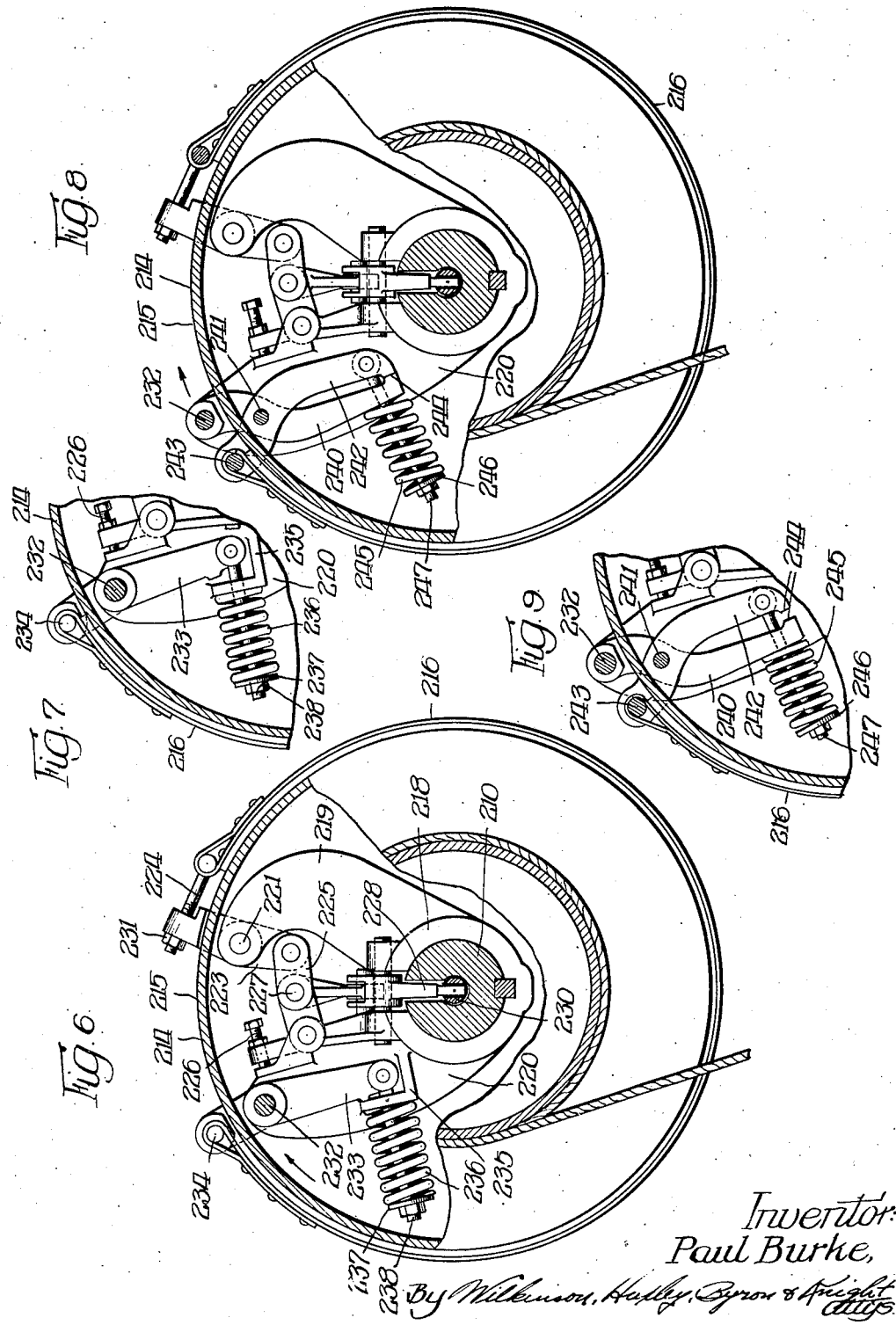
Inventor:
Paul Burke,
By Wilkinson, Huxley, Byron & Knight
Attys.

Patented Aug. 27, 1935

2,012,418

UNITED STATES PATENT OFFICE 2,012,418

LOAD LIMITING FRICTION CLUTCH

Paul Burke, Green Bay, Wis., assignor to Northwest Engineering Company, Green Bay, Wis., a corporation of Wisconsin Application May 24, 1933, Serial No. 672,619

17 Claims. (Cl. 192—56)

The invention relates to clutches and particularly to friction clutches having automatic load limiting release means.

The general object of the invention is to provide an improved type of friction clutch for transmitting power to a driven shaft from a driving member and which will incorporate means automatically releasing one of the friction elements of the clutch when the load reaches a predetermined maximum.

The invention contemplates a form of friction clutch in which the driven end of a friction band is securely and positively held in contact with the friction surface of the drum, and wherein the driving end of the band is yieldingly applied to the friction drum by resilient means forming part of the connection between the end of the clutch band and the driving pin. Since the driving pin transmits the driving torque pressure is applied on the resilient means, tending to compress the same in proportion to the torque transmitted, with the result that automatic tripping or release of the clutch takes place when the load is encountered in excess of that determined by the adjustment of the resilient means.

In view of the above a more specific object of the invention is to provide a load limiting friction clutch having novel release means which will be adjustable within limits to vary the maximum load transmitted, which will operate efficiently, and which will not easily get out of order.

A further object is to provide a friction clutch having automatic release means associated with one end of the friction band and having manually actuated means connecting with the other end and which means are under control of the operator at all times.

A further object is to provide release means for a friction clutch which will operate automatically to release the frictional engagement of the clutch elements when a predetermined load is placed on the driven member and which will also automatically return the elements to clutching position when the load is reduced.

A further object is to provide a clutch which will perform the usual primary function of a friction clutch and which will additionally limit the torque transmitted by the clutch to a controlled amount.

With these and various other objects in view the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a sectional view taken transversely of the driving shaft and showing a form of friction clutch equipped with the release means of the present invention, parts of the clutch being broken away to show the winding drum associated therewith;

Figure 2 is a longitudinal sectional view of the structure shown in Figure 1, parts of the driving shaft being sectioned to show the connections for manually releasing the clutch band;

Figure 3 is a sectional view taken transversely of the driving shaft and showing a friction clutch equipped with a modified form of release means;

Figure 4 is a detail sectional view showing the release means of Figure 1 in partly released position;

Figure 5 is a detail sectional view showing the release means of Figure 3 in partly released position;

Figure 6 is a sectional view taken transversely of the driving shaft and showing an external friction clutch equipped with the release means of the invention;

Figure 7 is a detail sectional view showing the release means of Figure 6 in partly released position;

Figure 8 is a sectional view of an external friction clutch equipped with a modified form of release means; and Figure 9 is a detail sectional view showing the release means of Figure 8 in partly released position.

Referring first to Figures 1 and 2 the driving shaft 10 connecting with any suitable source of power for rotating the shaft has rotatably mounted thereon the winding drum 11 having the cable 12 wound thereon. Formed integral with the drum is the web 13 flanged at 14 to provide an internal friction surface 15. Having frictional engagement with the surface is an expansible friction band 16 connecting at its ends, as will be more particularly described, with a spider 18 non-rotatably mounted on the driving shaft 10. Rotation of the shaft 10 and spider 18 is in turn transmitted to the friction band 16 positioned within and being concentric with the flange 14 for frictional engagement with the surface 15. Upon expansion of the band 16 the parts engage to cause rotation of the winding drum 11, winding up the cable 12 connected with any suitable load. The spider 18 is provided with spaced brackets 19 and 20, the latter having a lever 23 and a strut 24 rotatably secured thereto by pin 22, and said spider also providing a second arm 25 having secured to its outer end a driving pin 26. The ends of the friction band 16 are reinforced and by securement to brackets 27 and 28, respectively, bracket 28 having pivotal connection with the outer end of strut 24 and being also pivotally secured to the turnbuckle 29, in turn pivoted to one end of lever 23. This end of lever 23 is resiliently urged in a direction away from bracket 19 by the coil spring 30 positioned between the bracket and the end of the lever.

The other end of lever 23 has connection to bracket 20 through a toggle joint including toggle arms 31 pivotally connected together by pin 32 which likewise connects with link 33. Associated with one of the toggle arms is an adjustment screw 34 which engages with bracket 20 when the toggle is in position as shown in Figure 1. The screw is adjusted so as to hold the toggle arms from further movement after they have passed the dead center position. Movement of the toggle arms in the opposite direction is possible, being accomplished by the bell crank lever 35 rotatably mounted on pin 36 and having pivotal connection at one end with the link 33 and being engaged at its other end by the operating rod 37 having longitudinal movement within bore 38 formed in the driving shaft 10. Movement of the rod 37 to the left, Figure 2, rocks the bell crank lever 35 and through link 33 releases the toggle arms 31 to cause rocking of lever 23. This movement of the lever 23 is facilitated by spring 30 and functions to release the end 28 of the friction band from engagement with the friction surface 15. Movement of rod 37 toward the right, Figure 2, rocks the crank lever to cause upward movement of pin 32, locking the toggle arms and rocking lever 23 so that the end compresses the spring 30 to again cause frictional engagement of the band with the friction surface of flange 14. The turnbuckle 29 provides for adjustment in length of the connection between the bracket 28 and the end of lever 23 and thus provides for adjustment of the tension holding the friction band in engagement with the friction surface 15.

The spider 18, through arm 25 and driving pin 26 has connection with the other end of the friction band reinforced by bracket 27. As the driving torque is transmitted to the band through the driving pin 26 this end becomes the driving end and is accordingly provided with automatic release means permitting contraction of the friction band when the transmitted load reaches a predetermined maximum. The releasing mechanism comprises a rocker arm 40 rotatably mounted on the driving pin and having engagement with bracket 27 through a fulcrum pin 41 positioned with respect to the driving pin so that the rotation of rocker arm 40 counterclockwise, Figure 1, will cause movement of bracket 27 inwardly and substantially radially of the flange 14. The coil spring 42, however, yieldingly resists such rotation of the rocker arm, being interposed between the rocker arm and link 43 pivotally connecting at 44 with bracket 27. One end of the spring therefore seats against the rocker arm 40 while the other end is connected to the link 43 by the securing nut 45 which can be adjusted to vary the tension exerted by the coil spring and the tension resisting movement of the bracket 27 to released position.

The structure shown in Figure 3 is substantially the same as that of Figure 1, the driving shaft 110 having non-rotatably keyed thereto the spider 118 which connects with the ends of the friction band 116 through the turnbuckle 129 and driving pin 126, respectively. The releasing mechanism in this modification, however, is designed for transmitting heavier loads, having a heavier spring and including linkage of a more complicated nature. The driving pin 126 rotatably mounts the rocker arm 160, having pivotal connection with link 161, which link passes through an opening provided in the associated rocker arm 162 pivotally connected at 163 with the bracket 127 on the end of the friction band. The fulcrum pin 164 is located between the rocker arms 160 and 162 so that the torque from the driving pin 126 is transmitted through the arms and the fulcrum pin to the bracket 127. The coil spring 164 is interposed between the arm 162 and the link 161 having seating engagement on the arm and being connected to the link through the adjusting screw 165. Adjustment of screw 165 varies the compression exerted by the spring and thus the force resisting separation of the ends of the arms when they pivot on the pin 164.

Assuming a load on the cable 12, the operation of the clutch of Figure 1 is as follows:

The rotation of the driving shaft 10 is transmitted through the spider 18 to the friction band 16, which due to its frictional engagement with surface 15 causes rotation of the winding drum. The release mechanism remains inoperative as long as the load on the cable 12 or whatever other work is required of drum 11 does not exceed the maximum set for the clutch. When the load does exceed this predetermined maximum determined by adjustment of the compression of spring 42 the friction band contracts by movement of the driving end 27 inwardly. When the driving torque is opposed by a resisting force of sufficient magnitude to overcome the tension of the coil spring 42 the spring is compressed by rotation of the rocker arm 40, effecting release of the clutch parts. Slippage between the clutch elements will now occur and further winding of the cable 12 will terminate. The position of the parts with the clutch in released position is shown in Figure 4. Substantially the same operation takes place with respect to the releasing mechanism shown in Figure 3, with the exception that in this modification the rocker arms 160 and 162 have rotation on the fulcrum pin 164.

When the resistance opposing the driving torque of pin 126 exceeds the set maximum the friction band 116 contracts by movement of bracket 127 inwardly, releasing the clutch parts, since the force tending to compress the coil spring 164 overcomes its resistance with the result that the spring yields in compression, the rocker arms rotating on the fulcrum pin 164. The position of the parts with the clutch in partly released position is shown in Figure 5.

In friction clutches of the type described the force exerted by the expanding clutch band normal to the surface 15 and the coefficient of friction of the contacting surfaces determines the magnitude of the load transmitted by the clutch. This is variable in the present clutch through adjustment of the turnbuckles and the release springs. It will be observed that the driving end of the clutch in both modifications is driven through the parts, having a turning movement, and that the transmission of force from driving pin to the bracket on the clutch band end is along different planes at an angle to each other. Certain components of this force and of the equal and opposite opposing force act to cause turning of the rotatable parts, which turning movement is resisted by the coil springs. When the rotation of the winding drum and thus the outer member of the clutch is obstructed to such an extent that the resistance placed on the driving end of the friction band is of a magnitude to overcome the coil springs, compression of the springs takes place, contracting the band, resulting in a partial release of the clutching relation and termination of further increase of force tending to rotate the winding drum. When the load on the clutch is reduced the parts automatically resume clutching relation. It is also to be observed that the leverage ratio is favorable to the coil springs, permitting the use of a relatively small spring for the transmission of fairly heavy loads.

In Figure 6 the invention is shown applied to a friction clutch having an external friction band, the driving shaft 210 in this modification being provided with a spider 218 having a pair of spaced arms 219 and 220, respectively. The friction band 216 is located exteriorly of the flange 214 having the friction surface 215 on the exterior thereof for frictional engagement with the band. Pivotally secured as at 221 to the free end of arm 219 is a lever 223 having its outer end bent around the edge of the flange 214 and disposed over but spaced from the friction surface on the flange for adjustable connection with the friction band by means of the link 224. The other end of the lever has pivotal connection to one of a pair of toggle arms 225, the other toggle arm being pivoted to arm 220 and having associated therewith the adjustment screw 226 contacting with a stop on the bracket for limiting upward movement of the toggle arms after they have passed dead center. Connecting with the toggle arms at 227 is a bell crank lever 228 which is rocked by longitudinal movement of the operating rod 230 as has been previously described with respect to Figures 1 and 3. Actuation of the rod in one direction rocks the bell crank lever to break the toggle connection, shortening the distance between the pivot points of the toggle arms and rotating lever 223 to enlarge the friction band 216, releasing engagement of the same with the drum and rendering the clutch inoperative. With the toggle arms in position as shown in Figure 6 tension is applied to the friction band to hold the same in frictional engagement with the surface 215 and which can be adjusted by the nut 231 threaded to link 224.

The arm 220 provides a driving pin 232 on which is pivotally mounted a lever 233 having its outer end disposed over and spaced from the flange 214 on the drum for connection at 234 with the friction band. The other end of the lever contacts with bracket 235 integral with the arm and is yieldingly held in engagement therewith by the coil spring 236 confined between the bracket and washer 237 adjustably secured to the link 238 which has pivotal connection with the end of the lever 233 and extends through an opening in bracket 235.

The spider rotates in a clock-wise direction as indicated by the arrow, Figure 6, and with the parts in position as shown the friction band is yieldingly held in engagement with the friction surface to cause rotation of the drum. In this arrangement the driving pin 232 transmits the driving torque to the friction band through the pivoted lever 233 and when the load opposing the driving torque exceeds a predetermined maximum the friction band is enlarged, compressing the spring 236 through rotation of lever 233, causing release of the clutch relation to take place. A partly released position of the mechanism is shown in Figure 7.

The modification of Figure 8 is substantially similar in all respects to that shown in Figure 6, with the exception that the arm 220 extends outwardly of the flange 214, being located over and in spaced relation with the friction surface 215. The driving pin 232 is located on the outer end of the arm and pivotally mounts a lever 240 having pivotal connection at 241 with another lever 242 having one end located over the flange 214 for connection as at 243 with the friction band 216, both levers having their opposite ends disposed within the flange and engaging each other as at 244. Separation of their contacting ends is resiliently prevented by the coil spring 245 confined between lever 240 and washer 246 adjustably secured to the link 247 having connection at its other end with lever 242.

With the parts in position as shown in Figure 8 the friction band is yieldingly held in frictional engagement with the drum to transmit the driving torque thereto. In the event the load on the drum exceeds the predetermined maximum set for the clutch the contacting ends of the levers 240 and 242 will separate, compressing the spring 245, as the friction band automatically expands to release the clutching relation of the parts.

It is to be understood that I do not wish to be limited by the exact embodiments of the device shown, which is merely by way of illustration and not limitation, as various and other forms of the device will of course be apparent to those skilled in the art without departing from the spirit of the invention or the scope of the claims.

I claim:

1. In a clutch, a driving shaft, a drum rotatable on the shaft and providing an internal friction surface, a split clutch band contacting the friction surface, supporting means for the band non-rotatably secured to the shaft, connections between the ends of the band and the supporting means, one connection including a rocker arm rotatably carried by the supporting means, a fulcrum pin between the arm and the end of the band whereby rotation of the arm causes radial movement of the end of the band, and means resiliently holding one end of the arm and the end of the band against separation by rotation of the arm.

2. In a clutch, a driving shaft, a drum rotatable on the shaft and providing an internal friction surface, a split clutch band contacting the friction surface, supporting means for the band non-rotatably secured to the shaft, connections between the ends of the band and the supporting means, one connection including a rocker arm rotatably carried by the supporting means, a bracket on the end of the band, a fulcrum pin between the arm and bracket whereby rotation of the arm in one direction causes radial movement of the end of the band to release the same, a link secured to the bracket and passing through an opening in the arm, and a coil spring connecting the link and the arm to hold the bracket and arm together.

3. In a clutch, a driving shaft, a drum rotatable on the shaft and providing an internal friction surface, a clutch band contacting said surface, said band being split and having connection at its ends with the driving shaft, one connection including a pair of rotatable arms, and resilient means connecting the arms and resisting separation of their ends.

4. In a clutch, a driving shaft, a drum rotatable on the shaft and providing an internal friction surface, a clutch band contacting said surface, said band being split and having connection at its ends with the driving shaft, one connection including a pair of rotatable arms pivotally secured to an end of the band and to the shaft respectively, a fulcrum pin located between the arms, and resilient means connecting the arms and resisting rotation of the arms on the fulcrum pin.

5. In a clutch, a driving shaft, a drum rotatable on the shaft and providing an internal friction surface, a split clutch band contacting the friction surface, supporting means for the band non-rotatably secured to the shaft, connections between the ends of the band and the supporting means, one connection including a pair of rotatable arms pivoted to the band and supporting means respectively, a fulcrum pin located between the arms whereby rotation of the arms on the pin is possible, a link pivoted to one arm and passing through an opening in the other arm, and a coil spring connecting the link and the arm having the opening therein to hold the arms against rotation.

6. In a clutch, a driving shaft, a drum rotatable on the shaft and providing an external friction surface, a split clutch band contacting the friction surface, supporting means for the band non-rotatably secured to the shaft, and connections between the ends of the band and the supporting means, one of which includes a pivoted lever yieldingly held in contact with a stop on the supporting means, whereby expansion of the band to release the clutching relation will cause rotation of the yieldingly held lever in a direction away from its stop.

7. In a clutch, a driving shaft, a drum rotatable on the shaft and providing an external friction surface, a split clutch band contacting the friction surface, supporting means for the band non-rotatably secured to the shaft, and connections between the ends of the band and the supporting means, one of which includes a pivoted lever, a stop on the supporting means, and a coil spring for yieldingly holding the lever in engagement with the stop and the friction band in engagement with its friction surface.

8. In a clutch, a driving shaft, a drum rotatable on the shaft and providing an external friction surface, a clutch band contacting said surface, said band being split and having connections at its end with the driving shaft, one connection including a pair of pivotally connected arms, and resilient means maintaining one end of the arms in contacting relation to yieldingly hold the friction band in engagement with the friction surface whereby release of the clutching relation can take place only upon compression of the spring.

9. In a clutch, a driving shaft, a drum rotatable on the shaft providing an external friction surface, a clutch band contacting said surface, said band being split and connecting with the driving shaft, one connection including a pair of pivotally connected arms, one arm being pivotally secured to the supporting means, the other arm having connection with the friction band, and resilient means for maintaining the other end of the arms in contacting relation with each other and the clutch band yieldingly applied to the surface.

10. In a clutch, a driving shaft, a drum rotatable on the shaft and providing an annular friction surface, a split clutch band contacting said friction surface, supporting means for the band comprising a spider non-rotatably secured to said shaft, connections between the ends of the band and the supporting means, one connection including a resilient member operative to permit movement of the end of the band in a direction away from the friction surface upon compression of the resilient member, a strut pivotally connecting said other end of the band to the spider, an operating rod having longitudinal movement within a bore formed in the driving shaft, and means including a pair of toggle arms connecting said operating rod with the said other end of the band, whereby longitudinal movement of the operating rod in one direction will actuate the toggle arms to release said end of the band and movement in an opposite direction will reset the toggle arms to force said end of the band into contact with the friction surface.

11. In a clutch, a driving shaft, a drum rotatable on the shaft and providing an annular friction surface, a split clutch band contacting said friction surface, supporting means for the band comprising a spider non-rotatably secured to said shaft, connections between the ends of the band and the supporting means, one connection including a resilient member operative to permit movement of the end of the band in a direction away from said friction surface upon compression of the resilient member, a strut pivotally connecting the other end of the band with said spider, a lever pivoted intermediate its ends to said spider, one end of said lever connecting with the spider through a pair of toggle arms, said other end being biased in a direction to collapse said toggle arms, and a turn-buckle connecting said biased end of the lever with the said other end of the friction band.

12. In a clutch, a driving shaft, a drum rotatable on the shaft and providing an annular friction surface, a split clutch band contacting said friction surface, supporting means for the band comprising a spider non-rotatably secured to said shaft, connections between the ends of the band and the supporting means, one connection including a resilient member operative to permit movement of the end of the band in a direction away from said friction surface upon compression of the resilient member, a strut pivotally connecting the other end of the band with said spider, a lever pivoted intermediate its ends to said spider, one end of said lever connecting with the spider through a pair of toggle arms, said other end being biased in a direction to collapse said toggle arms, a turn-buckle connecting said biased end of the lever with the said other end of the friction band, and means mounted for longitudinal movement within a bore formed in the driving shaft for actuating said toggle arms.

13. In a device of the character described, in combination, driving and driven members, a clutch connecting said members including a split clutch band having frictional engagement with the driven member, means connecting the ends of the clutch band to the driving member including an arm rotatably carried by the driving member, said arm connecting through fulcrum means with an end of the clutch band whereby rotation of the arm in one direction will operate to release the clutch band and rotation in the other direction will force the clutch band into frictional engagement with said driven member, and resilient means maintaining the arm and said end of the band in associated relation but permitting rotation of the arm to release the clutch band against the tension of the resilient means.

14. In a device of the character described, in combination, driving and driven members, a clutch band connecting said members including a split clutch band having frictional engagement with the driven member, means connecting the ends of the clutch band to the driving member including a driving pin fixed to the driving member, an arm rotatably mounted on said pin, said arm connecting through fulcrum means with an end of the clutch band whereby rotation of the arm in one direction will operate to release the clutch band and rotation in the other direction will force the clutch band into frictional engagement with said driven member, and resilient means maintaining the arm and said end of the band in contacting engagement and said clutch band in frictional engagement with the driven member.

15. In a device of the character described, in combination, driving and driven members, a clutch connecting said members including a split clutch band having frictional engagement with the driven member, means connecting the ends of the clutch band to the driving member including a driving pin fixed to the driving member, an arm rotatably mounted on said pin, said arm connecting through fulcrum means with an end of the clutch band, said fulcrum means being located with respect to the driving pin to cause rotation of the arm upon transmission of the driving force from the pin through the fulcrum means to the clutch band, and resilient means maintaining the arm and said end of the band in associated relation but permitting rotation of the arm against the tension of the resilient means.

16. In a device of the character described, in combination, driving and driven members, a clutch connecting said members including a split clutch band having frictional engagement with the driven member, means connecting the ends of the clutch band to the driving member including an arm rotatably carried by the driving member, said arm connecting through fulcrum means with an end of the clutch band, and resilient means maintaining the arm against an abutment with the clutch band in frictional engagement with its member, whereby rotation of the arm in a direction to loosen the clutch band with relation to the friction surface takes place against the tension of the resilient means.

17. In a device of the character described, in combination, driving and driven members, a clutch connecting said members including a split clutch band having frictional engagement with the driven member, means connecting the ends of the clutch band to the driving member including an arm rotatably carried by the driving member, a second arm pivotally secured to an end of the clutch band, said arms being pivotally connected to each other whereby separation of their opposite ends serves to loosen the clutch band with relation to its friction surface, and resilient means for maintaining said opposite ends of the arms in contacting relation.

PAUL BURKE.